2 Sheets—Sheet 1.
J. D. MURPHY.
Carriage-Wheel.
No 23,695.
Patented Apr. 19, 1859.
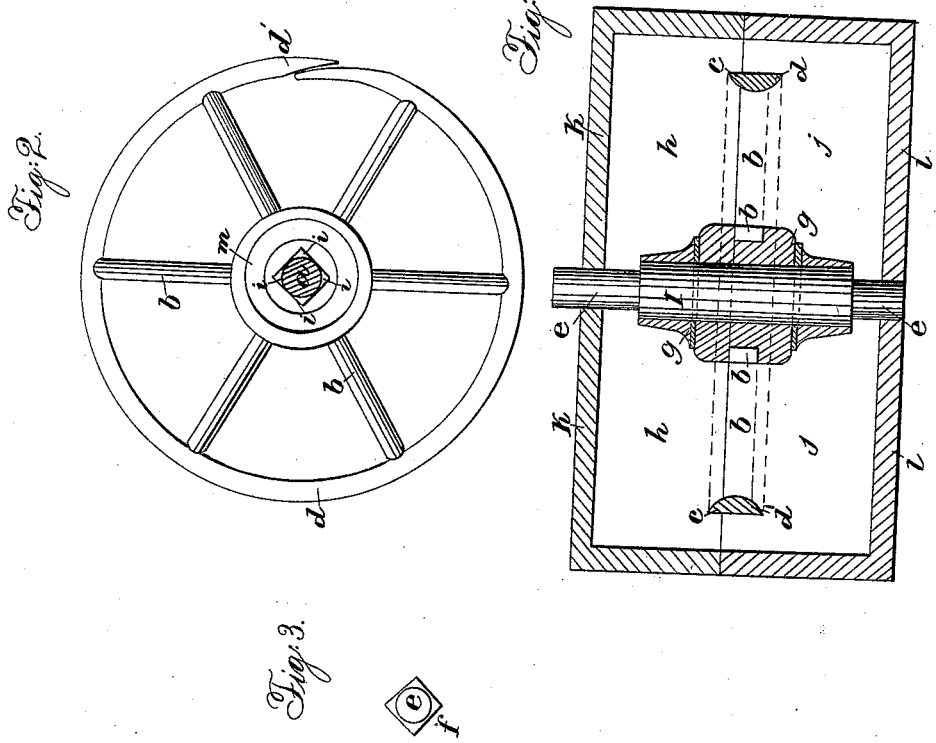

J. D. MURPHY.
Carriage-Wheel.
No 23,695.
2 Sheets—Sheet 2.
Patented Apr 19, 1859.
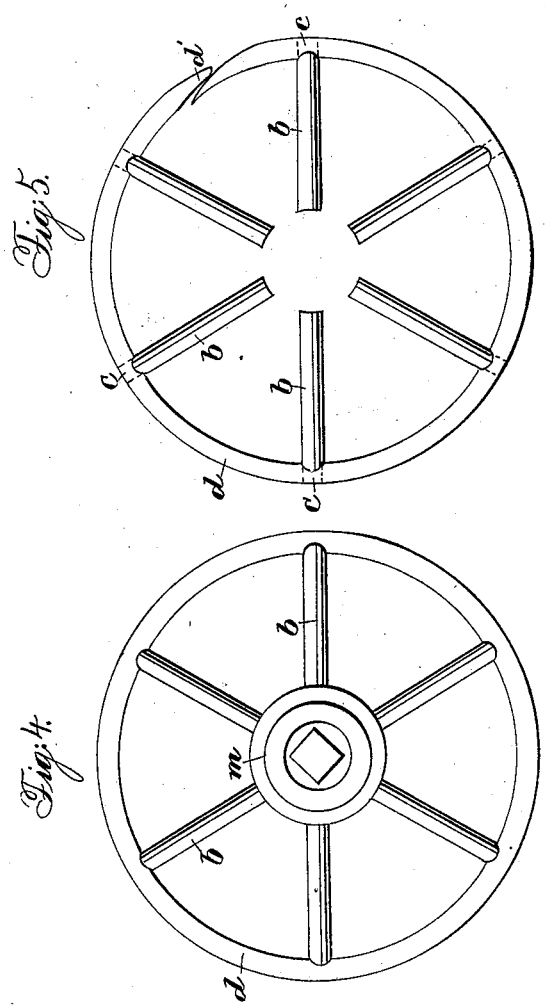

UNITED STATES PATENT OFFICE.

JOHN D. MURPHY, OF BALTIMORE, MARYLAND.

IRON CARRIAGE-WHEEL.

Specification of Letters Patent No. 23,695, dated April 19, 1859.

*To all whom it may concern:*

Be it known that I, JOHN D. MURPHY, of the city of Baltimore, in the State of Maryland, have invented an Improved Mode of Constructing Combined Wrought and Cast Iron Carriage-Wheels, &c.; and I do hereby declare that the following is a full and exact description thereof, reference being had to the accompanying drawings and to the letters of reference marked thereon.

To enable others skilled in the art to make and use my invention, I will proceed to describe its construction and operation.

In the drawings, $d$, represents the wrought iron rim of my improved wheel; $b$, the wrought iron spokes; $m$, the cast iron hub, and $a$, the axle of the wheel.

To manufacture my improved wheel a piece of iron $d$, of the proper thickness and form, is bent round in the form of the wheel, its ends overlapping at $d$, as shown in Figures 2 and 5; holes are then drilled or punched into this rim $d$, one for each spoke, and the tenons $c$, of the spokes $b$, are then inserted into the holes in the rim $d$, as represented in Fig. 5. The hub pattern is now molded in the molding sand $h$, $j$, contained in the boxes $k$, $l$, Fig. 1. After the pattern has been properly molded in the sand, the pattern is removed, and the sand core $e\ f$, is then inserted in the center of the hollow space $g$, formed by the removal of the hub pattern. The wrought iron rim $d$, open as shown at $d'$, with the tenons $c$, of spokes $b$, inserted into the corresponding holes in the rim $d$, is then placed together with the spokes between the two mold boxes so as to be partially embedded in the sand $j$, of the lower box $l$, as seen in Fig. 1. The rim with the spokes inserted, ready to be placed in the mold box, is represented in Fig. 5, the tenons being sufficiently loose in the holes to allow the spokes a slight lateral play as they expand or contract during the process of casting the hub, while the lap or opening $d'$, in the rim $d$, permits of the spokes expanding and contracting radially.

It will be seen from Fig. 1, that the inner ends of the spokes extend a certain distance into the hollow space $g$. Fig. 3 represents an end view of the sand core $e\ f$.

The molten cast iron is now poured into the mold so as to fill the space $g$, and when sufficiently cooled, the casting together with the rim and spokes, is taken from the mold box and the sand core $e\ f$, is removed when the appearance of the wheel will be as represented in Fig. 2, where it is shown together with the axle $a$. The rim is now welded at $d'$, and the outer ends of the tenons of the spokes being securely riveted to the rim, the wheel is complete as represented at Fig. 4.

If the hub is cast with a square hole, as shown in the drawings, the spaces $i$, between the sides of the hole and the cylindrical axle $a$, will form convenient receptacles for the lubricating substance, while at the same time the friction and wearing surface is greatly lessened.

It will thus be seen that I first form from a single piece of wrought iron, the entire rim, leaving an opening or lap therein as fully shown in the drawings. The wrought iron spokes are then inserted therein as shown, the rim and spokes are then placed in the mold as shown and described, and the hub cast around and on the inner ends of the spokes. The wheel is then removed and the lap $d'$, in the rim $d$, is then welded and the tenons of the spokes being riveted down the wheel is complete.

The opening in the hub of the wheel can be round or conical if preferred.

By this arrangement and by using a sand core instead of an iron mandrel, the molten metal can be heated to so high a degree that it will adhere to and be so closely united to the wrought iron spokes as to prevent the spokes ever being worked loose by use, while the open rim allows of the spokes contracting with the hub as it cools, so that all liability of the spokes being loosened by contraction is obviated, and a combined wrought and cast iron wheel is produced which for cheapness and durability it is believed, cannot be surpassed.

Many attempts have been made to construct combined wrought and cast iron carriage wheels, but from various causes, they have not been so constructed as to come into general use. In some of the attempts which have been made, it has been found that the great number of the parts rendered the wheels objectionable by reason of their complex construction and consequent liability to get out of repair, while in others the construction has been such that the expansion and contraction of the metal during the process of casting the hub has not been properly provided for, and as a natural consequence thereof such wheels have been found unsafe and unreliable when put to a practical test. The invention now sought to be patented, has been severely tested as respects these and other objections, and has proved in every instance highly satisfactory.

I am aware that combined cast and wrought iron wheels, have been constructed before, and I therefore wish to be distinctly understood as disclaiming the invention and construction of such wheels, broadly considered, but Having described my invention, what I claim therein as new and desire to secure by Letters Patent, is:

1. A combined wrought and cast iron wheel, when the several parts composing said wheel, are constructed in the form and arranged and combined in the order, as and for the purposes shown and described.

2. I also claim leaving the entire rim $d$, of the tread of the wheel, open at one place, as shown at $d'$, until after the hub is cast, in combination with the mode of inserting and fastening the spokes into the rim or tread of the wheel $d$, as and for the purposes above described.

JOHN D. MURPHY.

Witnesses:
 THOS. H. DODGE,
 M. C. GRITZNER.